April 23, 1957 G. AGNOLETTO 2,789,736
SEED-PLANTING IMPLEMENTS
Filed April 30, 1953 3 Sheets-Sheet 1
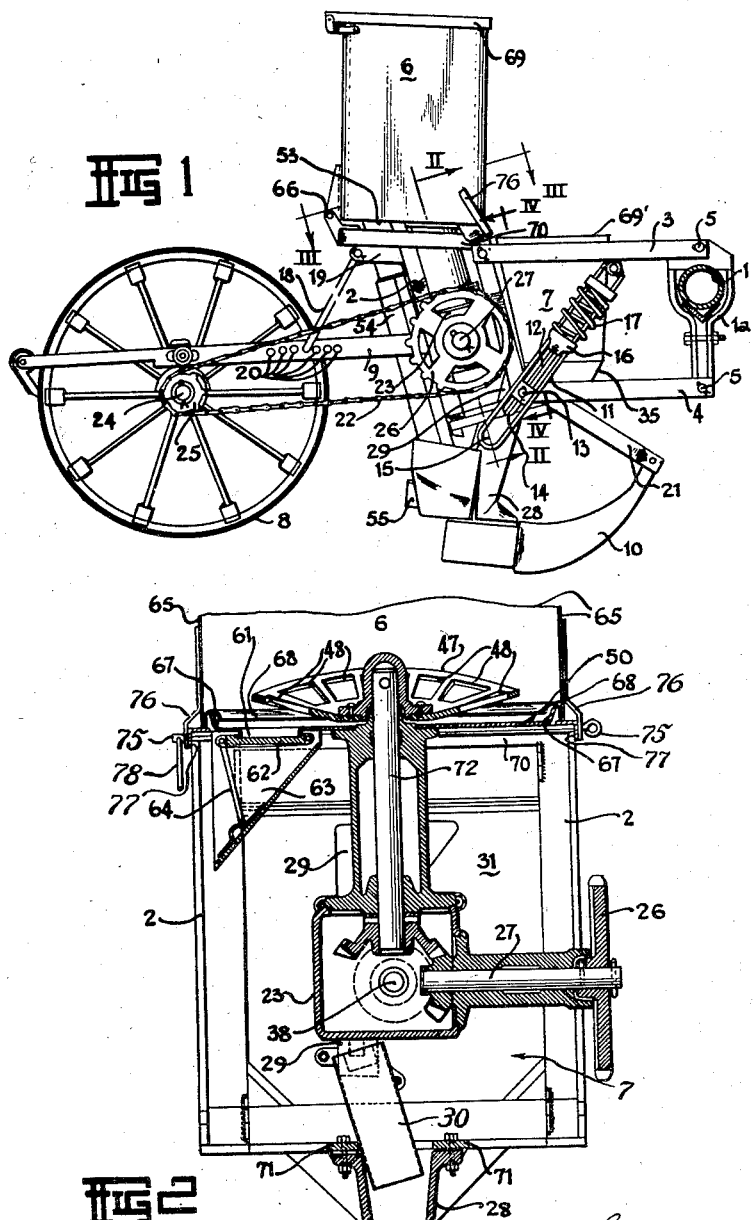

April 23, 1957  G. AGNOLETTO  2,789,736
SEED-PLANTING IMPLEMENTS
Filed April 30, 1953  3 Sheets-Sheet 2
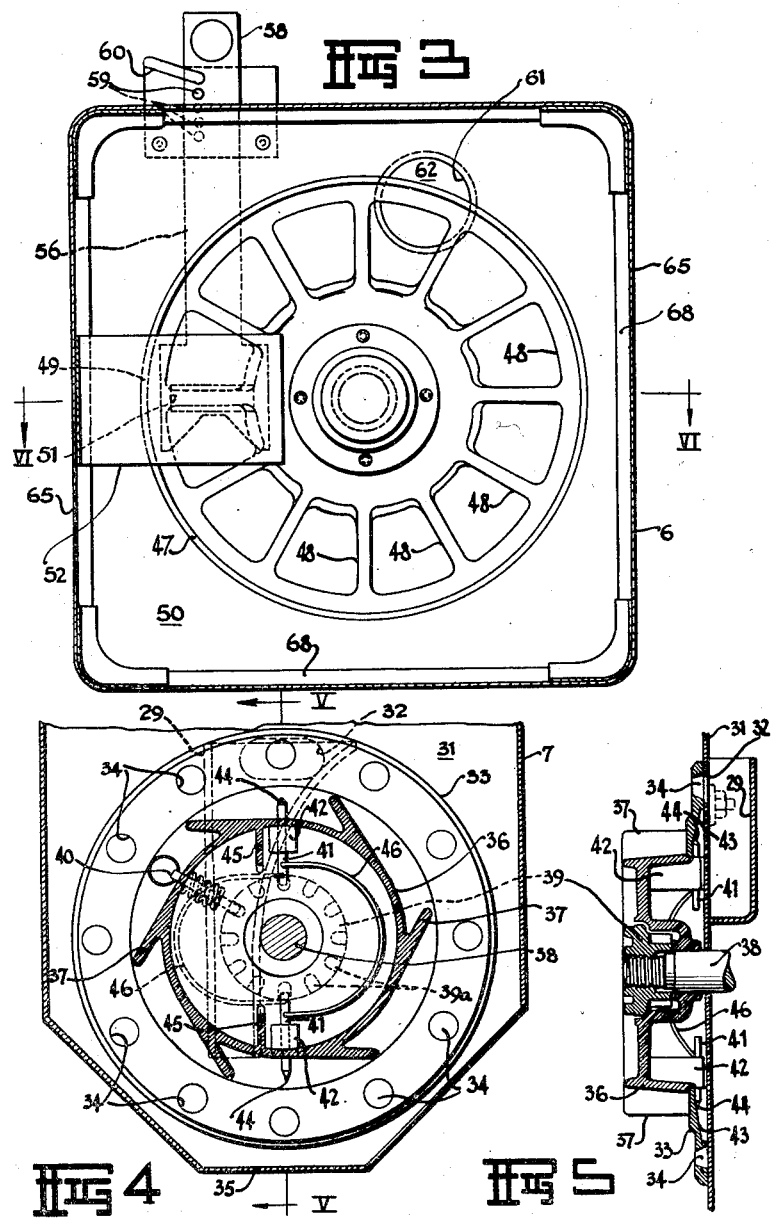
Inventor
Giovanni Agnoletto
By
Pennie, Edmonds, Morton, Barrows & Taylor
Attorneys April 23, 1957     G. AGNOLETTO     2,789,736
SEED-PLANTING IMPLEMENTS Filed April 30, 1953     3 Sheets-Sheet 3

Inventor
Giovanni Agnoletto
By
Pennie, Edmonds, Morton, Barrows & Taylor
Attorneys

United States Patent Office 2,789,736
Patented Apr. 23, 1957

2,789,736

SEED-PLANTING IMPLEMENTS

Giovanni Agnoletto, Bellevue, Johannesburg, Transvaal, Union of South Africa, assignor to National Die-Casting Company (Proprietary) Limited, Johannesburg, Transvaal, Union of South Africa, a company of the Union of South Africa Application April 30, 1953, Serial No. 352,249

Claims priority, application Union of South Africa July 21, 1952

2 Claims. (Cl. 222—242)

This invention relates to seed-planting implements and more particularly to seed planters adapted for operation with a tractor provided with power lift means, preferably of the known hydraulically operated three-point linkage system type. Although the seed planter according to this invention is preferably for use on tractors having the known three-point linkage type hydraulic lifting systems, it is nevertheless also adaptable on tractors having other kinds of hydraulic or mechanical lifts without departing from the invention. The invention is particularly intended to provide a seed-planting implement capable of planting almost any kind of seed without damaging or breaking such seeds while granular or powdered fertilizer feeding means are also provided for a constant or synchronised intermittent discharge of the fertilizer.

According to this invention the seed planter comprises at least one planting unit capable of planting one row of seeds which is disconnectably and adjustably coupled by its front end to a elevatable tool bar attached or associated with the power lift of a tractor, said planting unit in turn comprises a planter type wheel, a blade or share for opening the planting furrow, seed and fertilizer containers, a frame structure for mounting of the said containers, share and wheel, seed and fertilizer discharge control means driven from said land wheel, linkage means connecting the frame structure to tool bar coupling devices, and means for controlling the relative movement of the linkage means during the operative and inoperative positions of the said planting unit; the arrangement being such that for inoperation the planter unit is completely raised off the ground while for operation it is lowered for the share and wheel to engage the ground causing controlled seed and fertilizer discharge when the implement is in motion while the earth-engaging parts follow the ground contour independently of the relative position of the tractor or adjacent planting units.

More particularly a single but preferably spaced pair of clamps are provided on the front end of a planting unit for connection to the tool bar which in turn is connected to the tractor power lift means. Each planter unit provides two frames forming the linkage means which are disposed one above the other in substantially parallel spaced relationship and pivotally connected about horizontal axes by their front ends to the aforesaid tool bar coupling clamp or clamps and by their rear ends to the frame structure providing mounting means for the seed and fertilizer containers, share and wheel.

The front region of the upper linkage frame has connection means for at least one pivotally connected slotted stay which extends towards the rear region of the lower linkage frame. Within the slot of the stay a strut element, pivotally connected to the said rear region of the lower linkage frame, is slidably located and adapted to form a stop when engaging the bottom end of the said slot to limit downward deflection of the linkage frame when the implement is raised by the tractor power lift whereas spring means acting on the slotted stay and the strut provides resilient resistance to upward deflection of the rear region of the linkage frame and more particularly of the planter implement proper during operation of the planter.

The planter wheel is mounted in a frame which is pivotally connected by its front end to the said frame structure while oblique stays, extending from the frame structure, are adjustably connected to the wheel-locating frame for varying the relative position of the wheel with respect to the structure and share for adjustment of the depth of planting of the seeds. Said planter wheel transmits power to the seed and fertilizer discharge control means by a chain drive and through a gear box. The gear box is disposed within the frame structure to which the linkage frames and wheel frame are pivotally secured and by which the seed and fertilizer containers are carried.

The seed container is of substantially downwardly converging cross-sectional shape providing a flat inclined rear wall and a sloping bottom. Said seed container is rigidly mounted on the front part of the frame structure and freely within the space enclosed by the linkage frames whereas the fertilizer container is rigidly mounted on the top of the frame structure. Within the seed container the seed-discharge control means are operatively disposed on the inclined rear wall of the former and comprise a rotatable disc-like member disposed in close parallel spaced relationship relative to the said inclined wall and further provided with a series of equally spaced holes adjacent the circumferential edge for coming successively in line with a discharge port provided in the upper region of the said inclined wall as the disc-like member is rotated. Said holes are bevelled to widen in the direction of the said container wall so that seeds located in the said holes may readily escape through the seed discharge port.

The said disc-like member is disengageably and replaceably connected to a central part which in turn provides a plurality of tangentially arranged vanes for gently agitating the contents of the seed container and which part is fixed to a shaft extending perpendicularly through the inclined container wall from the gear box. Said centre part comprises a substantially hollow frustoconically shaped casing from the outer oblique circumferential surface of which the said vanes extend for short distances while a central hub part incorporating a nut member engages a screw-threaded neck part of the shaft whereby the spacing of the disc-like member relative to the inclined container wall may be varied. For ready fixing of the annular disc-like seed-feed member the circumferential edge is preferably bevelled for engagement by diametrically opposed retractable pins which are slidably and rotatably located in diametrically opposed guides provided on the centre part. The said pins which are of conical shape as regards their outer ends have their inner ends connected by a U-shaped spring normally biasing said pin outwardly. Said U-shaped springs on rotation through an angle of at least 180° is adapted to be engaged by inwardly directed in-line cam elements provided on the interior of the centre part casing for bending the limbs of the said springs inwardly and consequent retraction of the pins.

The fertilizer container is mounted on top of the frame structure and comprises a fixed bottom element on which the casing, consisting of four walls and a lid, is hingedly mounted. The bottom member provides a discharge opening of variable aperture and also a normally closed emptying opening. Within the fertilizer container a fertilizer feed means, comprising an inverted shallow conical disc having a plurality of closely spaced apertures, is provided and which is mounted with its axis obliquely with respect to the fertilizer container bottom so that one section of the underface of the said conical member is disposed substantially parallel to the container bottom at the position of the discharge opening. An inwardly directed plate is fixably mounted to one of the container walls for parallel spaced disposition above the fertilizer container discharge opening and below which the conical member is adapted to move.

In order that the present invention may be more clearly understood and carried into practice, reference will now be made to the accompanying sheets of drawings on which like reference numerals refer to like parts throughout the several views.

In the drawings:

Figure 1 is a side elevation of a seed planter unit constructed according to the present invention;

Figure 2 is a cross-section, drawn to an enlarged scale, taken on line II—II of Figure 1;

Figure 3 is a cross-section on line III—III of Figure 1 drawn to an enlarged scale;

Figure 4 is a transverse cross-section through the seed container only, taken on line IV—IV of Figure 1 and drawn to an enlarged scale;

Figure 5 is a cross-section taken on line V—V of Figure 4;

Figure 6:
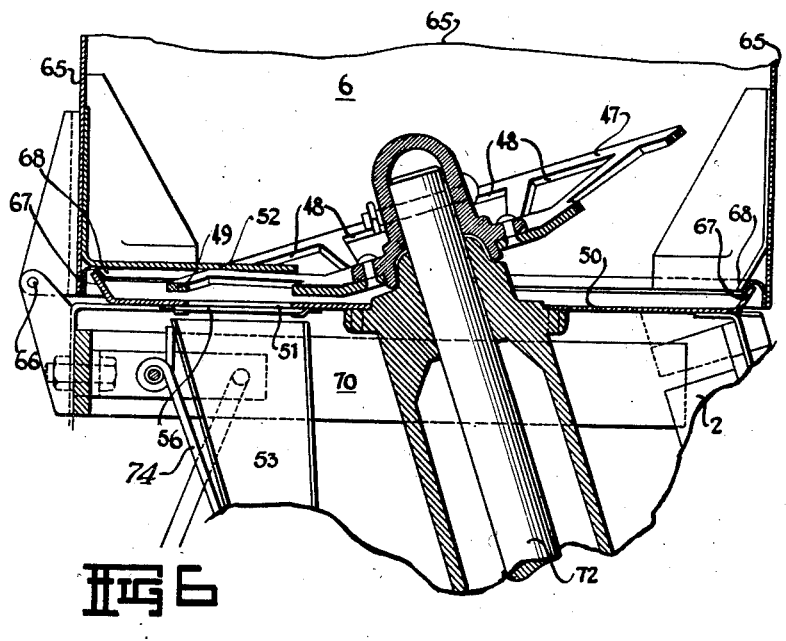
Figure 6 is a fragmentary cross-section taken on line VI—VI of Figure 3.

Referring to the drawings, the tool bar connected to the power lift of the tractor is denoted by reference numeral 1 and on which clamping devices 1a are clamped. The planter unit according to this invention comprises an obliquely disposed frame structure 2 to the front region of which linkage frames 3 and 4 are pivotally secured for connection on to short shafts 5 provided on the mounting clamps 1a. On top of the frame structure 2 the fertilizer container 6 is mounted while on the front oblique surface of said frame structure 2 the seed container 7 is mounted. A press wheel 8 is freely rotatably mounted in a mounting frame 9 which has its front end pivotally secured to the rear of the frame structure 2. The furrow-opening share 10 is rigidly secured to the lower region of the frame structure 2 and is located substantially below the seed container 7.

Oblique slotted stays 11 are pivotally connected to the front region of the upper linkage frame 3 and are adapted to extend obliquely rear and downwardly towards the rear pivot axis of the lower linkage frame 4. Within the slot of each slotted member or stay 11 a strut element 12 is disposed which is preferably pivotally mounted about the rear pivot axis 13 of the lower linkage frame 4. The lower ends 14 of the said strut element 12 are adapted to form a stop when engaging the bottom end 15 of the slot of the slotted member 11 in order to limit downward deflection of the linkage frames 3 and 4, so that, on raising of the tool bar 1 the frame structure 2 and associated parts remain stationary until the bottom end 14 of the strut 12 engages the bottom end 15 of the slotted member 11 whereupon the entire seed-planter unit is also elevated. This provision permits the planter unit to perform its planting action when traversing a rough land and more particularly when the tractor is raised to a limited extent relative to the planter. Upward deflection of the frames 3 and 4 is controlled on engagement of the opposite headed end 16 of the strut 12 with a compression spring 17 mounted about and fixed to the said slotted stay 11. Said spring provides shock-absorbing means, particularly when the planter unit is rapidly lowered for operation and also for maintaining engagement of the share 10 into the ground while further upward deflection is permissible particularly when striking an obstruction such as a rock or the like. A slotted member 11 with associated parts is preferably provided on both sides of the planter unit.

The press wheel 8 is mounted in a frame 9 which is pivotally connected by its front end to the said frame structure 2 about a transverse horizontal axis. Oblique stays 18 which are pivotally connected in respect of their top ends to rearwardly extending brackets 19 of the frame structure 2 are adapted to be selectively engaged in respect of their lower ends in any corresponding pairs of pluralities of spaced holes 20 provided in the wheel-mounting frame 9 for varying the relative position of the wheel 8 with respect to the frame structure 2 and share 10 for adjustment of the depth of planting. By engaging the lower ends of the stays 18 in holes 20 further away from the frame structure 2, the wheel 8 will be raised relative to the said frame structure 2 and consequently the planting depth will be greater while on engaging the said ends of the stays 18 in holes 20 closer to the frame structure 2 a lesser depth of planting results.

The transmission of power from the wheel 8 to the seed and fertilizer discharge control means is by way of a chain drive 22 to a totally enclosed gear box 23. The wheel 8 is provided with a live axle 24 passing through bearings which in turn are adjustably connected to the wheel-mounting frame 9 in order to control the slackness of the chain 22 which passes over a chain sprocket 25 mounted on the said shaft 24. The said chain 22 passes over a chain gear 26 which in turn is fixed to a shaft 27 which extends transversely from the gear box 23.

The said gear box 23 is mounted within the aforesaid frame structure 2 which in turn conveniently consists of two parallelly disposed U-shaped brackets connected at their top and bottom regions by transverse members to form a rigid frame for mounting of the seed and fertilizer containers 7 and 6 respectively, the furrow-opening share 10 supporting members 21 and 28, the wheel-mounting frame 9, seed and fertilizer discharge guide members 29 and 54 and provides the pivotal connecting means for the linkage frames 3 and 4.

The seed container 7, which is of downwardly converging cross-sectional shape, to form a hopper, provides a flat inclined rear wall 31. Said hopper-like container 7 is located within the linkage frames 3 and 4 to which it is, however, not attached while the fertilizer container 6, which is of substantially rectangular construction, is mounted on the top of the implement frame structure 2.

The seed-discharge control or seed-feeding means, shown in Figs. 4 and 5, comprises the container or hopper 7 having a seed-discharge aperture 32 in the upper region of the rear wall 31 and a flat annular member 33 which is rotatable within the hopper 7 close to the said wall 31 and which member 33 is provided with a series of spaced holes 34. On rotation of the said member 33, the holes 34 successively come in line with the hopper discharge aperture 32. Said holes 34 are bevelled or countersunk to widen in the direction of the inclined container wall 31 for the seeds located within said holes 34 to readily drop from such holes through the aperture 32. The base or bottom 35 of the seed container 7 is obliquely disposed for gravitational flow of seeds on to the said annular member 33 for seeds to become located in the holes 34 for elevation by the annular member 33 and subsequent discharge through the wall aperture 32. It is a feature of this invention that the wall 31 of the seed hopper 7 is obliquely disposed while the spaced distance or clearance between the seed transfer member 33 and the said wall 31 is variable or adjustable.

The annular seed-feed member 33 is disengageably connected to a centre part 36 which is of substantially frusto-conical shape. Said centre part 36 is provided on its circumferential surface with a plurality of tangentially disposed short vanes 37 for gently agitating the contents of the seed container. The centre part 36 is mounted on the end of a shaft 38 which extends from the gear box 23 perpendicularly through the inclined wall 31. An adjusting and locating nut 39, engaging a screw-threaded necked end part of the shaft 38 is provided for securing the centre part 36 on the said shaft 38 in adjustable spaced relationship as regards its face relative to the inclined wall 31 of the container 7.

In order to prevent rotation of the nut 39 relative to the centre part 36, the nut 39 is provided with a notched circumferential surface (as shown in broken lines at 39a in Figure 4) adapted to be engaged by a retractable spring-loaded pin 40 arranged radially in the centre part 36. The hub of the centre part is preferably a tight but sliding fit on the shaft 38 and may be provided with a longitudinal notch for engagement by a short radial projection provided on the shaft to prevent relative rotation of the said part with respect to the shaft 38. The nut 39 is preferably provided with finger grips or the like so that it may be rotated by hand for the purpose of adjusting the clearance between the seed-feed member 33 and the inclined wall 31 of container 7.

The annular seed-feed member 33 is adapted to be locked to the circumferential edge of the centre part 36 by means of two diametrically opposed pins 41 which are slidably movable in guides 42 provided radially on the centre part 36. The pins are thus radially disposed and on forced outward movement engage under the inner circumferential edge of the said member 33. The inner marginal edge 43 of the seed-feed member 33 is bevelled while the ends 44 of the pins 41 are of conical shape for producing a wedging action on the member 33 for the rigid mounting of the latter. The taper of the conical ends 44 of the pins 41 preferably corresponds with the taper of the bevelled edge 43 of the member 33.

The centre part 36 is provided internally with two inwardly projecting in-line cam elements 45 located parallel to the said retractable wedging pins 41 and in the same half of the centre part casing. A spring element 46 which in its operative position is bent to U-shape is connected by its end parts in diametrical holes provided in the wedging pins 41 whereby such pins are normally forced outwardly capable of retraction when the spring is swung through an angle of slightly more than 180° for engagement by the said in-line cams 45 when the spring ends are forced towards one another. When the spring 46 engages the cams 45 retraction of the wedging pins 41 results for release of the seed-feed member 33.

The seeds lodged in the holes 34 of the annular seed-feed member 33 are raised and deposited successively through the opening 32 in the upper region of the inclined rear wall 31 of the seed container 7 to pass through a funnel-like seed guide 29 which in turn guides the seeds through a chute 30 (Fig. 2) into a passage provided in the share-mounting member 28 for guiding such seed into the furrow opened by the share 10. The seed container 7 is further provided with a seed-emptying opening in the inclined bottom 35 which is normally closed by a sliding door or gate.

The fertilizer-feeding means for even distribution of the fertilizer at a required rate of flow provide means whereby packing of the fertilizer between the movable and fixed parts is reduced to a minimum, while clearing of the means is readily effected. According to this feature the means for fertilizer feeding comprises a rotatable conveyor member in the form of an inverted shallow conical disc 47 provided with a plurality of closely spaced apertures 48. This disc 47 is mounted with its axis obliquely within the fertilizer container 6 for having one face section 49 disposed substantially parallel to the container bottom 50 at the position of the discharge opening 51. A horizontal plate 52 is fixably mounted in the container in parallel spaced relationship to the said bottom 50 and below which the disc section 49 is adapted to move whereby continual gravitational flow of fertilizer through the said discharge opening 51 is prevented. The said discharge opening 51 is of adjustable aperture and causes discharge of fertilizer into a funnel 53 from whence the fertilizer flows into a readily removable guide tube 54 and subsequently through guiding means for positioning in correct relationship relative to the seed within the furrow. Chute 54 may be retained in position by a spring member 74 mounted on the funnel 53, as shown in Fig. 6. Said guiding means preferably incorporates a member 55 for dividing the fertilizer material into two streams in order not to deposit such fertilizer directly on to the seeds according to known practice.

Figure 7:
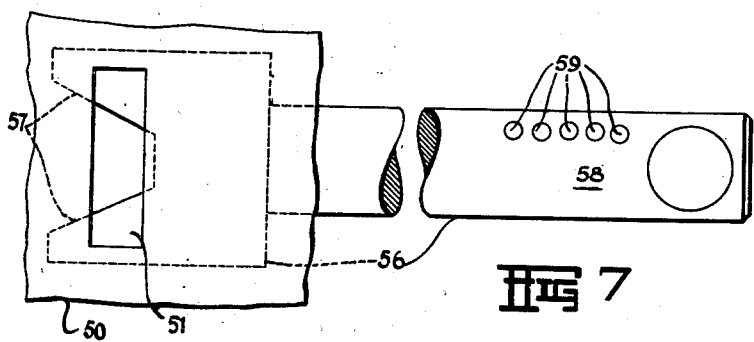
Figure 7 is a detail view of the adjusting means of the fertilizer container discharge opening.

The opening 51 in the container bottom 50 is of rectangular shape, as shown in Fig. 7. A slide 56 is associated with said opening 51 which in turn presents a V-shaped end 57, or a triangular shaped cavity, which is adapted to coact with the opening in such a fashion that on retraction of the said slide 56 relative to the opening 51 the effective area of the opening is increased. The said arrangement provides a fine control of the effective discharge cavity and consequently the rate of fertilizer discharge. The free end 58 of the said slide 56 is located adjacent one side of the bottom 50, as shown in Fig. 3, and is provided with a plurality of holes 59 for engagement by a retractable element 60 for locking the shaped end of the slide 56 in any one of a plurality of positions relative to the discharge opening 51. At another convenient position within the bottom 50 an opening 61 is provided whereby the contents are readily emptied. The said opening 61 is closed off by a trap-door 62 hinged to the under surface of the container bottom 50 and located in a chute 63 while a strut 64 of spring material is provided to retain the trap-door 62 in the closed position.

The side walls 65 of the fertilizer container 6 form a single unit hingedly mounted on the frame structure (Figs. 1 and 6) over the bottom part 50 as at 66 so that the conical feeding means 47 may be removed when desired particularly as the aforesaid horizontal plate 52, disposed in parallel spaced relationship to the bottom 50, is secured to the adjacent side wall 65. To prevent escape of the fertilizer along the meeting edges of the bottom 50 and side walls 65, the bottom is provided with upwardly bent marginal edges 67 over which complementary hook-like and preferably resilient flanges 68, provided on the bottom regions of the walls 65, are adapted to engage tightly. Such tight engagement is obtained by manufacturing said flanges 68 from a resilient metal. The fertilizer container 6 as also the seed container 7 are provided with hinged lids 69 and 69', respectively, or like closure members.

The frame structure 2 mounting the containers 6 and 7, gear box 23, planter share 10 and the like conveniently consist of two obliquely and parallelly disposed U-shaped frames secured together in spaced relationship by a U-shaped frame 70 connecting the upwardly projecting ends and structural members 71 connecting the transverse bottom members of said U-shaped frames. The bottom members 71 are also connected together by a suitable member such as a casting 28 forming the share-fixing member and incorporating a seed-guiding passage. The latter member is preferably a casting whereas the aforesaid frame members are preferably constructed from structural steel.

The upper and lower linkage frames 3 and 4, which are preferably both of H-shape, are connected by their rear ends to the upper and lower region of the foremost of the said obliquely disposed U-shaped frames while the front ends of said linkage frames are pivotally connected to the aforesaid coupling clamps 1a. The seed container 7 is fixed to the front U-shaped frame while the gear box 23 is fixed between and preferably to both such frames. Said gear box 23 is obliquely disposed due to the oblique disposition of the said frames so that the upwardly extending shaft 72 extends obliquely through the bottom 50 of the fertilizer container 6 for oblique location of the feeding disc 47, whereas the forwardly projecting shaft 38 from the gear box 23 is located at a slanting position to extend perpendicularly through the inclined rear wall 31 of the seed container 7.

The casing or chute for guiding the fertilizer into the furrow is secured to the rear of the share-mounting casting 28 while the removable guide tube 54 is adapted to extend with its lower end into said casing. A hook-like element is fixed to the bottom region of the tube 54 for engaging the rear wall of the said casing, thus locating the chute in position while the top end of the chute, which engages over the funnel 53 leading from the container bottom 50, is held removably in position by the spring member 74.

The tension of the single hinged wall unit of the container 6 over the bottom 50 is conveniently effected by a rod 75 which extends through holes in coacting parts 76 and 77, respectively attached to said unit and the upper front portion of the frame structure 2 at its opposite sides, as shown in Fig. 2. A removable member 78 engaging a transverse hole in the end of the rod 75 at the left in Fig. 2 is provided to prevent accidental disengagement of the said rod from the coacting parts 76 and 77.

For multi-row planter two or more of the aforesaid unit type planters are secured in spaced relationship to a common tool bar 1 fixed to the tractor for simultaneous operation. Due to the linkage couplings 3 and 4 provided on each unit-type planter, each planter operates independently of the adjacent planter so that each may follow the contour of the land at its position for operation thereby ensuring constant depth of planting of seeds for all planters. For inoperation all the unit-type planters secured to the said tool bar 1 are simultaneously elevated.

What I claim is:

1. In a seed planter, a seed dispensing assembly comprising a rotary mechanism for dispensing seeds in timed relation to translatory movement of the planter, a seed hopper having a downwardly and inwardly slanting wall, said rotary mechanism comprising an annular rotatable member provided with a plurality of equally-spaced holes adjacent to its circumferential edge, said rotatable member being disposed in closely-spaced parallel relationship of the inner surface of said slanting wall of the hopper, the annular member including a bevelled surface on its inner peripheral edge, a hollow substantially frusto-conically shaped center part located internally of the hopper and provided with diametrically-arranged guides, a pair of diametrically-opposed pins slidably and rotatably located respectively in said guides disengageably and concentrically connecting the annular member to the center part, said pins being provided with conically-shaped outwardly-directed ends for engaging in wedging fashion the bevelled inner peripheral edge of the annular member, the said center part including a plurality of tangentially-arranged vanes on its circumferential face for gently agitating the contents of the hopper and for transferring such contents from the upwardly-moving side of the annular member to the opposite side to prevent the building up of the contents in one side of the hopper, a U-shaped spring connecting the inner ends of said pins and in one position normally biasing said pins outwardly into engagement with said annular member, stationary cam elements carried by said center part in line with each other and located to one side of said pins, said U-shaped spring when swung into an alternate position being adapted to engage said cam elements and have its limbs sprung inwardly to retract said pins thereby disengaging the pins from said annular member, said slanting hopper wall having a seed discharge opening in its upper portion with which the various holes of the annular member successively register for the successive discharge therethrough of the seeds carried in and elevated by the holes of the rotatable annular member, and a drive shaft extending perpendicularly through said slanting hopper wall on which said center part is adjustably and lockably mounted.

2. In a seed planter, a seed dispensing assembly comprising a rotary mechanism for dispensing seeds in timed relation to translatory movement of the planter, a seed hopper having a downwardly and inwardly-slanting wall, said rotary mechanism comprising an annular rotatable member provided with a plurality of equally spaced holes adjacent to its circumferential edge, said rotatable member being disposed in closely-spaced parallel relationship to the inner surface of said slanting wall of the hopper, a hollow substantially frusto-conically shaped center part located internally of the hopper and to which said annular member is disengageably and concentrically connected, a drive shaft extending perpendicularly through said slanting hopper wall on which said center part is adjustably and lockably mounted, said center part providing a central hub for engaging the drive shaft and including a plurality of tangentially-arranged vanes on its circumferential face for gently agitating the contents of the hopper and for transferring such contents from the upwardly-moving side of the annular member to the opposite side to prevent the building up of the contents in one side of the hopper, a nut member coactingly associated with the central hub of the center part and engaging a correspondingly screw-threaded neck end of the shaft for varying the spacing of the annular rotatable member relative to the coacting slanting hopper wall, said nut having a plurality of spaced notches in its circumferential surface, and a spring-loaded locking pin disposed radially in the center part for locking the nut to the center part and arranged to engage any one of a plurality of said spaced notches in the circumferential surface of the said nut by its inwardly directed end, said slanting hopper wall having a seed discharge opening in its upper portion with which the various holes of the annular member successively register for the successive discharge therethrough of the seeds carried in and elevated by the holes of the rotatable annular member.

References Cited in the file of this patent

UNITED STATES PATENTS

| | | |
|---|---|---|
| 801,139 | Eisenhart | Oct. 3, 1905 |
| 991,758 | Shaw | May 9, 1911 |
| 1,282,648 | Smith | Oct. 22, 1918 |
| 1,286,464 | White | Dec. 3, 1918 |
| 1,290,090 | Cole | Jan. 7, 1919 |
| 1,901,639 | Tapp | Mar. 14, 1933 |
| 2,054,552 | Wakeham | Sept. 15, 1936 |
| 2,351,078 | Silver | June 13, 1944 |
| 2,351,511 | Hipple et al. | June 13, 1944 |
| 2,363,749 | Rude | Nov. 28, 1944 |
| 2,426,529 | Silver | Aug. 26, 1947 |
| 2,640,405 | Wheeler | June 2, 1953 |
| 2,649,725 | Oehler et al. | Aug. 25, 1953 |
| 2,656,951 | Murphy | Oct. 27, 1953 |